M. BIRKIGT.
BRAKE DRUM, PULLEY, OR THE LIKE.
APPLICATION FILED MAR. 28, 1919.

1,394,402.

Patented Oct. 18, 1921.

Sss# UNITED STATES PATENT OFFICE.

MARC BIRKIGT, OF BOIS-COLOMBES, FRANCE.

BRAKE-DRUM, PULLEY, OR THE LIKE.

1,394,402.

Specification of Letters Patent. Patented Oct. 18, 1921.

Application filed March 28, 1919. Serial No. 285,889.

*To all whom it may concern:*

Be it known that I, MARC BIRKIGT, a citizen of the Republic of Switzerland, residing in Bois-Colombes, Seine, France, have invented certain new and useful Improvements in Brake-Drums, Pulleys, or the like, of which the following is a specification.

This invention relates to brake drums, pulleys or the like. The invention has for an object to make brake drums or the like so that they are lighter and more durable, while it is possible to cool them in a more efficacious manner than hitherto.

The brake drum or the like according to the present invention comprises a body of a light metal having secured thereto on the surfaces whereon slipping or friction occurs, a thin rim or lining of steel or other hard metal, the friction being exerted either on the outer or on the inner surface, or even on both surfaces. The simultaneous use of a heavy, hard metal in the form of a thin (drawn or rolled) hard lining for the surfaces where the friction occurs and of a light metal or alloy for the body itself results in the production of a resistant and exceedingly light object.

The invention further comprises certain other arrangements more explicitly referred to hereinafter and claimed in the claims.

The invention will be clearly understood from the following description and the accompanying drawings, given by way of example.

Figure 1:
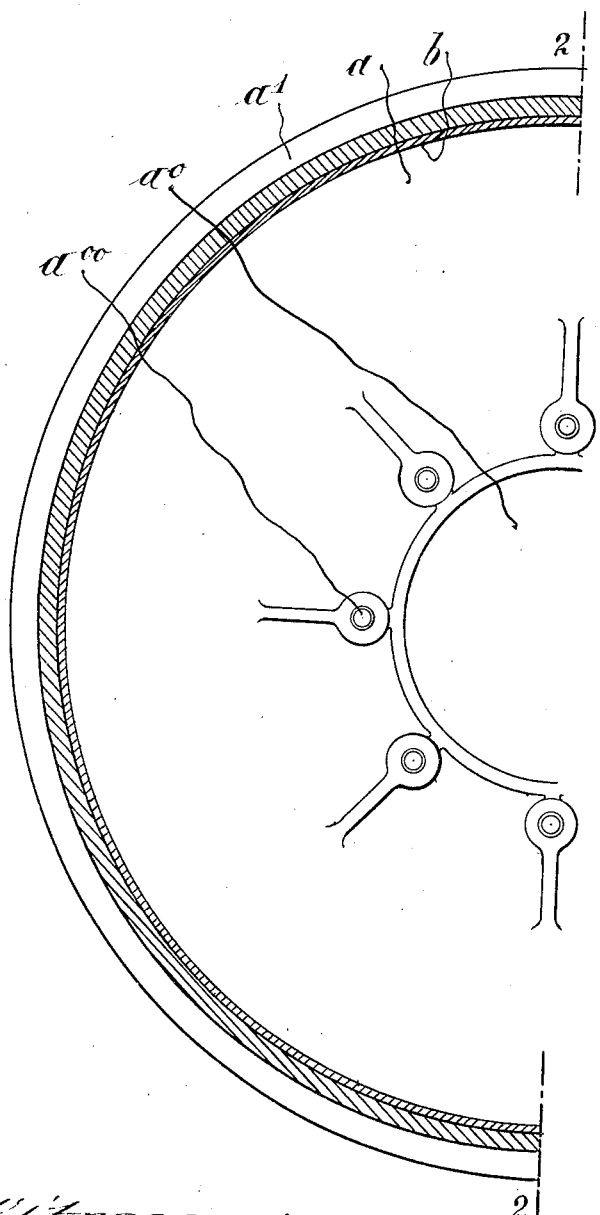
Figure 2:
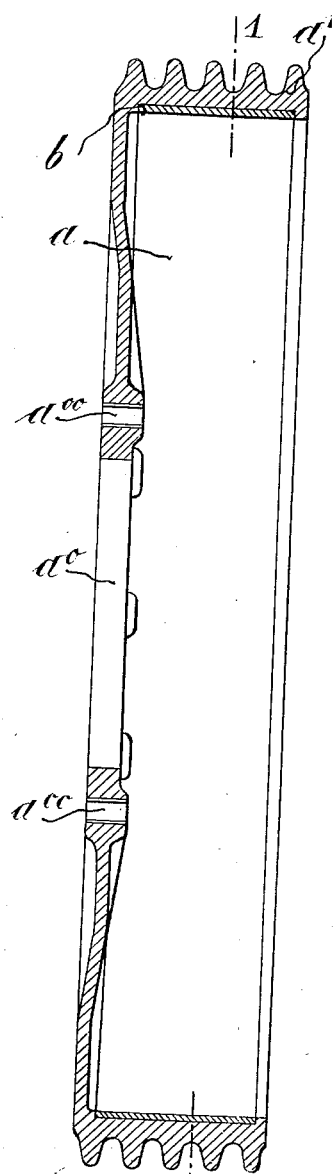

Figures 1 and 2 show respectively in section on the line 1—1, Fig. 2, and on the line 2—2, Fig. 1, a brake drum according to the invention.

The brake drum $a$ is made of an aluminum alloy, for instance in the form of a cup which is bored at $a°$ to receive the spindle on which the drum is to be mounted, and the drum and the spindle are secured together by any suitable means, for instance, by means of an intermediate part connected to the drum by bolts or rivets passing through holes $a°°$.

The rim is arranged concentrically with the axis of the drum and made of a metal resisting wear, such as a hard spring steel band $b$. The steel band or ring $b$ can be arranged in the mold in which the casting of the drum is to take place in the position which it is to occupy, so as to obtain after casting and removal from the mold, a drum in which the said band is set and to which it adheres, making intimate contact therewith permitting a free heat interchange.

Through such or other means of fixation of the lining a drum is obtained which is ready to receive a brake which acts on the drum through the band whether the said band be placed outside or inside the drum. The drum is made in the form of a cup in the latter case.

A part $a$ is made of light and readily fusible metal and the inner or outer walls of it are provided with ribs $a'$ arranged parallel to the direction of movement firstly for the purpose of reinforcing and strengthening the drum as well as lightening it and secondly for the purpose of easily cooling the drum during the braking operation.

A brake drum constituted as described, is exceedingly light, its wear is less than that of the brake drums generally used, as the process of rolling, drawing or the like permits, when the proper kind of steel or other metal is used, very resistant surfaces to be obtained thereby allowing the use of thin linings.

Obviously the invention is not limited to the construction described but comprises any modifications within the scope of the claims, including of course that the rim $b$ may be driven with force on to or into the drum. The drum may be used as a transmission or guide pulley or any like purpose.

What I claim as my invention and desire to secure by Letters Patent is:—

1. A brake drum having a body made of a light metal and a comparatively thin lining of a hard metal, the latter being of greater specific weight than the former, said lining being fixed on the surfaces of said body which are subject to frictional contact.

2. A brake drum having a body of an aluminum alloy and a lining made of a thin band of steel secured on the surface of said body which is subject to frictional resistance.

3. A brake drum having an active surface formed of a metal adapted strongly to resist wear and a body formed of a light, readily fusible metal.

4. A brake drum having a body of an aluminum alloy, and a thin lining of drawn spring steel on a surface of said body whereon frictional effects are experienced.

5. A brake drum having a body of aluminum and a thin lining of a hard metal capable of resisting wear on a surface of said body whereon frictional effects are experienced.

6. A brake drum comprising a friction shoe of hard material provided with reinforcing means in intimate contact therewith made of metal having a high heat conductivity.

7. A brake drum comprising a friction shoe of hard material, and reinforcing means in intimate contact therewith provided with heat dissipating elements.

8. A brake drum comprising a friction shoe of hard material, and reinforcing means in intimate contact therewith provided with heat dissipating flanges.

9. A brake drum formed of a thin band of hard material and a heat dissipating reinforcing element cast in unitary contact therewith.

10. A brake drum comprising a friction shoe of homogenized material and a reinforcing element of high heat conductivity cast in unitary contact therewith.

11. A brake drum comprising a rolled wheel friction shoe and an aluminum alloy reinforcing element cast unitarily therewith.

In testimony whereof I have hereunto set my hand in presence of two subscribing witnesses.

MARC BIRKIGT.

Witnesses:
JOHN F. SIMONS,
PAUL BLUM.